United States Patent [19]

Huston

[11] Patent Number: 4,472,025

[45] Date of Patent: Sep. 18, 1984

[54] VISUAL ORIENTATION DEVICE

[76] Inventor: Henry H. Huston, P.O. Box 1034, Burlington, Vt. 05402

[21] Appl. No.: 416,382

[22] Filed: Sep. 9, 1982

[51] Int. Cl.³ .............................................. G02B 5/00
[52] U.S. Cl. ...................................... 350/319; 350/557
[58] Field of Search ................ 350/319, 557, 574, 291

[56] References Cited

U.S. PATENT DOCUMENTS 3,508,896 4/1970 Turner ................................. 350/319
4,050,792 9/1977 Svensson ............................. 350/319

FOREIGN PATENT DOCUMENTS 250057 2/1966 Austria ................................ 350/319

Primary Examiner—Jon W. Henry
Attorney, Agent, or Firm—Brooks Haidt Haffner & Delahunty

[57] ABSTRACT

A visual orientation device mounted in fixed position at a selected location in an historical park or similar place for use by pedestrians to sight remote objects of interest. The device comprises a vertical cylindrical housing having a plurality of fixed viewing tubes extending therethrough at various eye levels, each tube aimed at a different site object, and printed indicia adjacent to the respective tubes describing the sighted objects.

7 Claims, 4 Drawing Figures

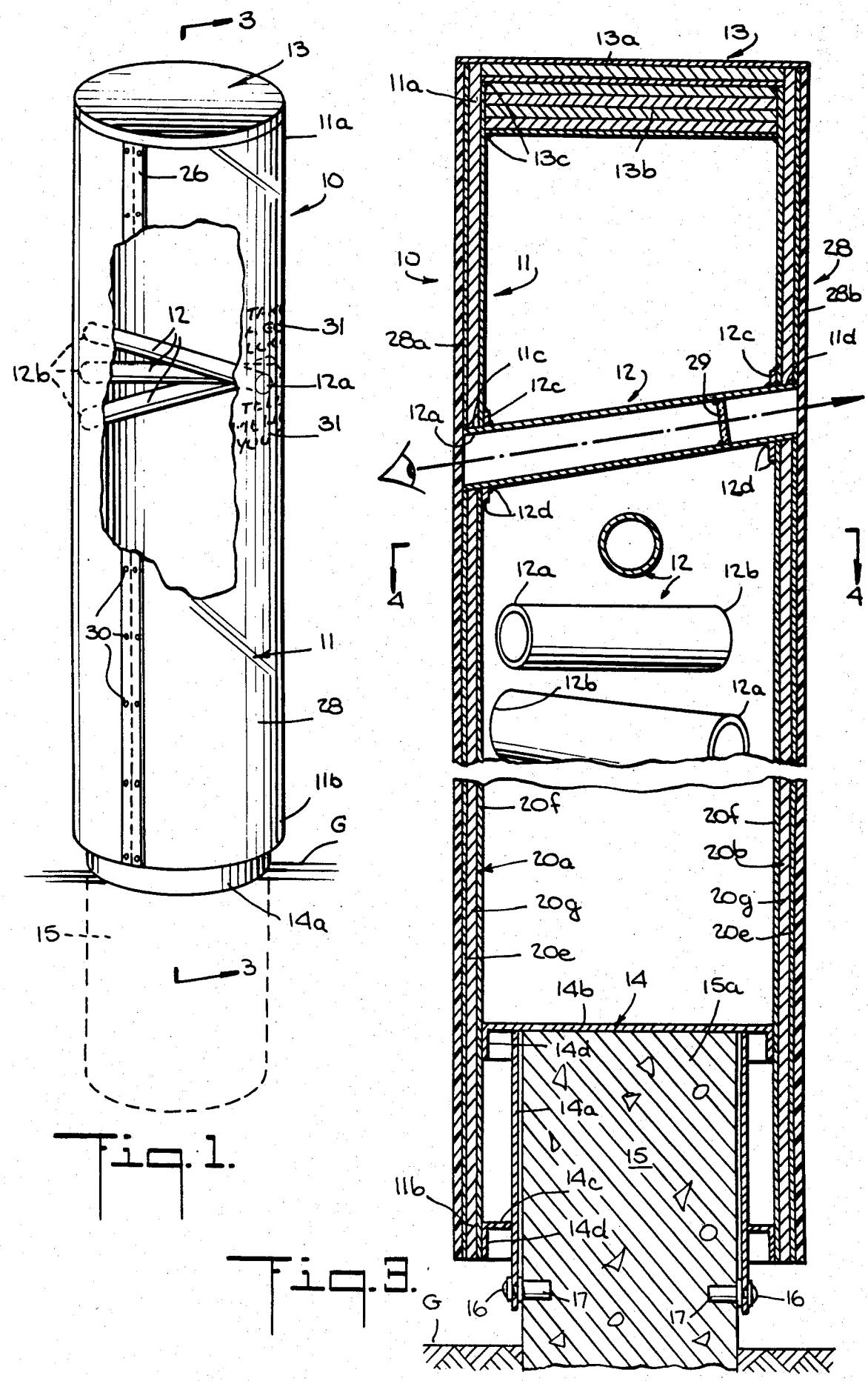

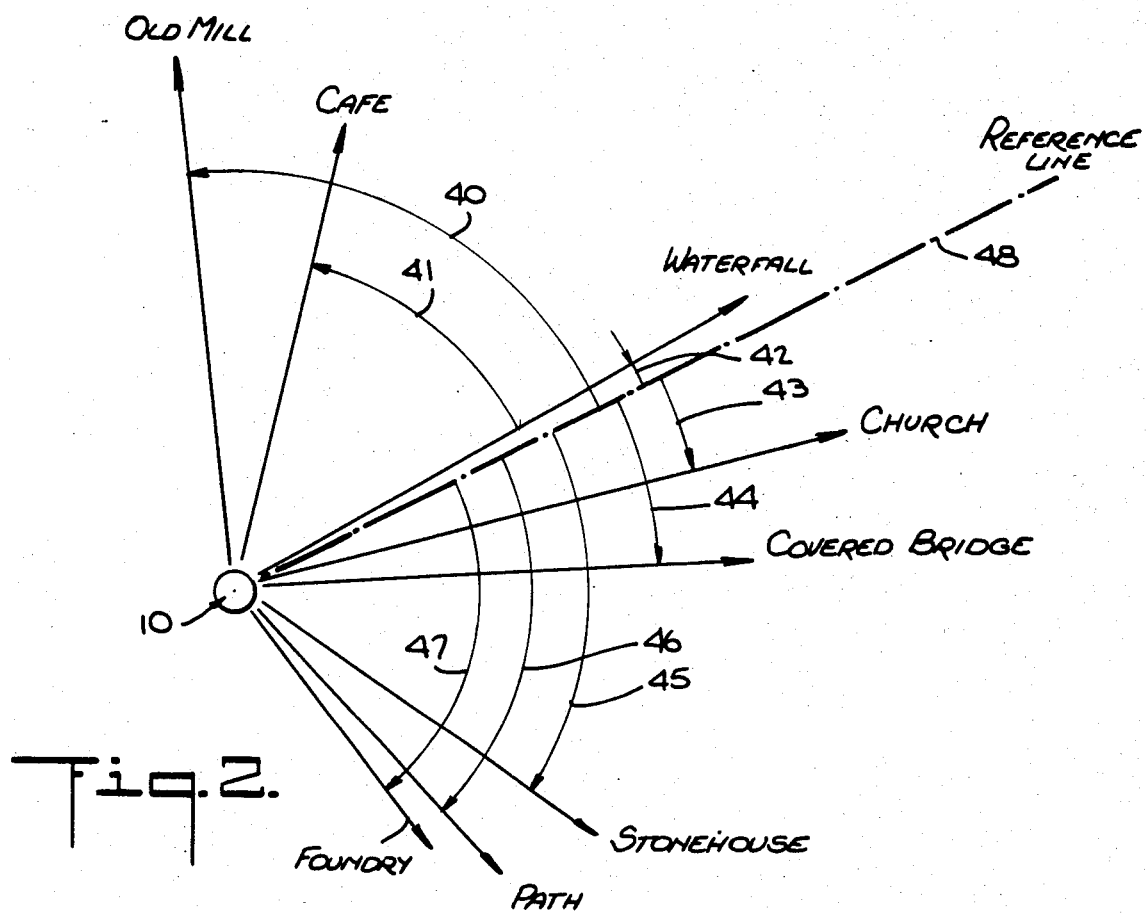
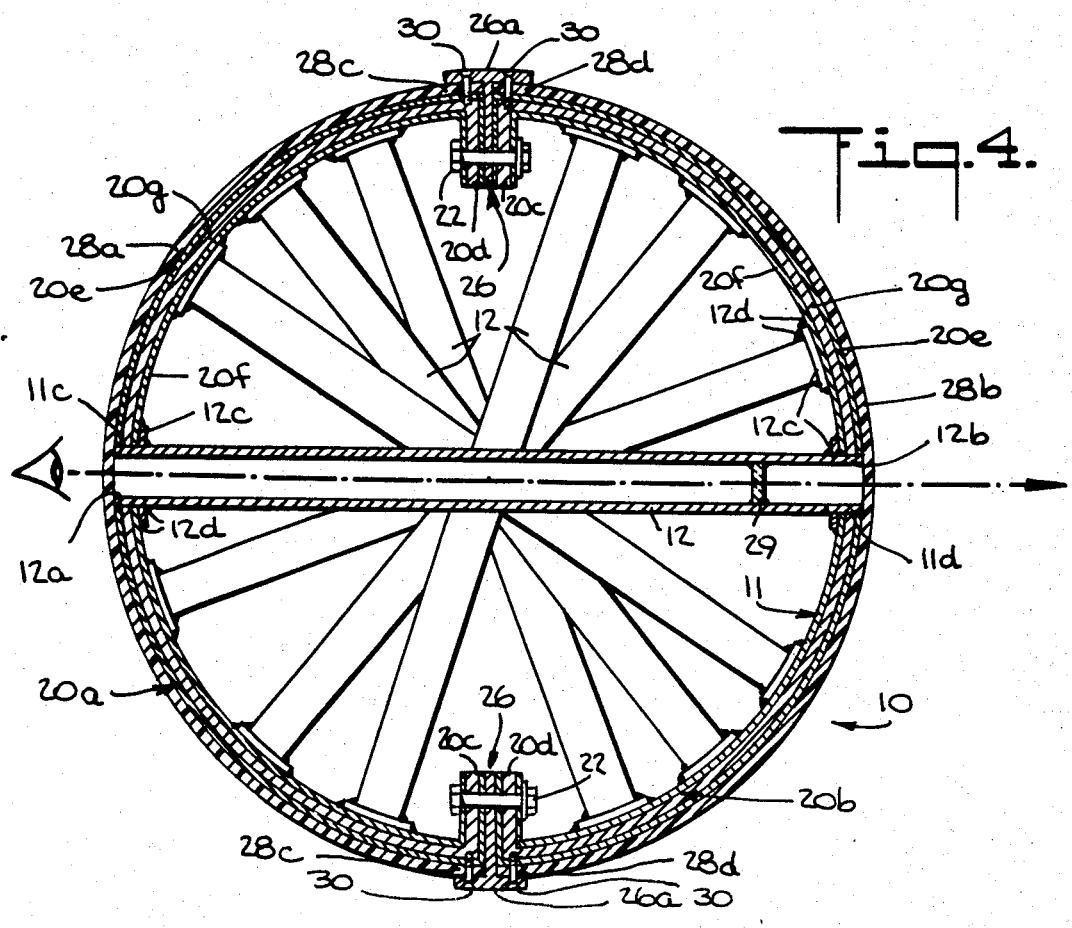

VISUAL ORIENTATION DEVICE

FIELD OF THE INVENTION

This invention relates to see-through viewing devices and, more particularly, to those which may be used by tourists, study groups and other pedestrians in parks, exhibition sites and similar places to assist them in their appreciation of features of particular interest.

BACKGROUND OF THE INVENTION AND THE PRIOR ART

Pedestal-mounted binoculars and telescopes are conventional types of viewing devices located in parks or at roadside lookouts and similar places to assist tourists and other pedestrians in locating and viewing distant site objects. However, the aiming of such devices towards any of a variety of such distant objects is more often left to the viewer, usually without adequate guidance or instruction regarding what is being viewed, or suggestions of other directions in which to look to sight objects of related interest to those already seen. The information on plaques or the like as are sometimes adjacent to such viewing devices must be coordinated by the viewer with his or her manipulation of the device, often times leaving questions regarding whether or not the reference site object was actually seen. Moreover, there is usually insufficient room on such plaques for significant information to stimulate interest or otherwise suggest why the viewer should actually visit the site object.

Of course, such binoculars and telescopes can be used by only one person at a time, which is often a disadvantage.

Accordingly, there exists a need for a device for better visual orientation of pedestrians at such places of scenic or historical interest. Such a device should be automatically aimed or trained on each remote site object so that there can be no mistake regarding whether it has been identified. As in the case of binoculars and telescopes, the device should be useful for viewing a number of such site objects. However, as a corollary, it is desirable that such a device have capability for simultaneous use by a number of persons. It should also positively coordinate each viewed object with the information to be conveyed regarding it, and provide for considerably more of such information than has been generally possible in the past. Of course, since it will be permanently installed in a public place, the device should be resistant to vandalism insofar as possible.

Although magnification of the viewed object has conventionally been believed to be an advantage in such viewing devices, magnification is sometimes deceptive in that the viewer obtains a false impression that virtually all of the details of the object are visible and have been seen and understood whereas, in fact, closer actual visual inspection of the object would reveal significantly greater details for study and enjoyment. Accordinly, although magnification might be incorporated as a feature, in its preferred form the device provided by the present invention intends only to unmistakably sight and identify the object, sometimes even incompletely, without magnification, and to stimulate a desire in the viewer to actually visit and learn more regarding the sighted object.

BRIEF DESCRIPTION OF THE INVENTION

Briefly and generally describing a visual orientation device in accordance with a preferred form of the invention, a plurality of sighting or viewing tubes, one for each of the several objects to be viewed using the device, are contained within an elongated vertical housing which is preferably cylindrical in form. The vertical cylindrical housing is mounted in fixed position on a pedestal or other immovable mounting at a selected location within a park or exhibit area, or at a scenic lookout station or similar place from which all of the site objects can be seen without significant obstruction. The sighting or viewing tubes are attached extending generally transversely across the interior of the housing and are respectively aimed at each of the several site objects. Each tube is therefore a fixed eyepiece through which only one of the objects may be seen.

The sighting ends of the viewing tubes are located at various convenient eye levels, and all are preferably on the same side of the housing. Thus, a number of persons can utilize the device at the same time to view and learn about the different objects. The tubes are disposed in various directions, angled upwardly, downwardly or laterally with respect to each other, as they extend across the otherwise hollow housing.

Printed indicia on the housing exterior, adjacent to each viewing tube sighting end, identifies the tubes and the site objects to be viewed therethrough. Preferably, additional selected information of interest concerning the site is included in the legend associated with each tube.

To discourage use of the viewing tubes from their object ends, each has a one-way mirror mounted within it, adjacent to its object end, to prevent viewing therethrough in the wrong direction.

The cylindrical housing of the device is formed of laminated structural material having an outer laminate of anodized aluminum, in which apertures are cut to receive the sighting and object ends of the viewing tubes. The housing is then sheathed with a clear plastic sheet material, on the interior surface of which the object identification legends and descriptions have been printed. These housing components are formed using semi-cylindrical sections to facilitate construction, as will be described.

The viewing tubes are made of rolled aluminum material, a one-way mirror being mounted in each as previously described. They are attached spanning across the hollow interior of the housing between the respective openings in the aluminum shell which have been provided to receive them. The clear plastic sheathing material of the housing closes the respective end openings of the viewing tubes.

At its lower end, the housing has an interior pedestal adaptor construction which fits over, and supports the housing on a cylindrical-shaped concrete pedestal placed in the ground at the location of the device in the park, exhibition area, or other site. An anodized aluminum cap is attached to close the upper end of the housing.

DETAILED DESCRIPTION OF A PREFERRED EMBODIMENT

These and other objects, features and advantages of the invention will be apparent from the following detailed description of a presently preferred embodiment thereof, which should be read in conjunction with the accompanying drawings in which:

FIG. 1 is a perspective view of a visual orientation device in accordance with the present invention;

FIG. 2 is a diagram showing, as a hypothetical example, the relative horizontal headings of several typical park exhibits in relation to the device, to explain its construction and use;

FIG. 3 is an enlarged and fragmentary sectional view taken along line 3—3 in FIG. 1; and FIG. 4 is an enlarged cross-sectional view taken along line 4—4 in FIG. 3.

Referring to FIGS. 1 and 3 of the drawings, a visual orientation device in accordance with the invention is generally indicated by reference numeral 10 and is shown supported in an upright position. The device 10 has an elongated, vertically disposed, cylindrically shaped housing 11 which mounts at least one, and preferably more, cylindrical viewing tubes 12. The housing 11 is also shown to have attached thereto a cap 13 at the upper end 11a thereof, and a pedestal adaptor 14 attached to, and projecting downwardly at the lower end 11b thereof. In the illustrated embodiment, the housing 11 is about seven feet (7') high and two feet (2') in diameter, and the viewing tubes are each one and one-half inches (1½") in diameter.

Referring to FIG. 4, it will be seen that the cylindrical housing 11 is formed of two, preformed semi-cylindrical portions 20a and 20b, the inwardly turned flanges 20c, 20d, of which are joined together by a plurality of bolts 22. Each semi-cylindrical portion 20a, 20b, as well as the cap 13, is formed of structural material, preferably a laminated material sold under the trademark "Alucobond", having an exterior or outer anodized aluminum laminate or skin 20e, as seen in FIG. 4. The thus formed peripheral wall of the device 10 has an inner skin 20f of aluminum, and an interior core 20g of composite material. The outer skin 20e is anodized to a medium bronze finish. Either prior to or following assembly, the semi-cylindrical portions 20a, 20b are coordinately apertured to accommodate the viewing tubes 12 in a carefully plotted manner as will be described, so that each viewing tube will be aimed at a designated site object.

As shown in FIGS. 3 and 4, the opposite ends 12a, 12b of each viewing tube 12 are supported within the respective housing apertures 11c, 11d. To secure the attachment, an aluminum washer 12c is cemented, using epoxy cement 12d, to each viewing tube end and to the interior skin 20f of the housing 11. As indicated in FIG. 3, a one-way mirror 29 is positioned and cemented, using similar epoxy cement, within each viewing tube 12, adjacent to its object end 12b. The one-way mirror 29 permits viewing through the tube from its sighting end 12a, but prevents viewing in the wrong direction from the object end 12b. The mirror 29 is positioned about one and one-quarter inches (1¼") inwardly from the object end 12b of each tube.

The viewing tubes 12 may be positioned within their respective apertures 11c, 11d by sliding them therethrough after the semi-cylindrical housing portions 20a, 20b have been bolted together by bolts 22, the washers 12c being mounted thereon as the tubes are moved into the housing. Referring to FIG. 4, it will also be noted that, as the housing halves are brought together, an elongated T-shaped extruded aluminum retainer 26 is sandwiched between the flanges 20c, 20d, on each side of the housing 11, as shown, the retainers extending along the entire length of the housing 11. The bolts 22 are then inserted and tightened to secure the halves and the T-shaped retainer 26 therebetween.

As will also be noted from FIG. 4, the exposed top flange 26a of each T-shaped retainer is spaced outwardly from the housing outer skin 20e about one-eighth inch (⅛") after the bolts 22 are in place.

The T-shaped retainers 26 are used to retain a one-eighth inch (⅛") thick clear plastic coating sheet 28 (FIG. 1) which, as seen in FIG. 4, is also formed in two semi-cylindrical portions 28a, 28b. Although other transparent materials might be used, the preferred material is sold under the trademark "Lexan", which is a clear transparent polycarbonate sheet material. As seen in FIG. 4, the ends 26c, 26d of the respective semi-cylindrical portions 28a, 28b fit into the spacing between the top flange 26a of the T-shaped retainer 26 and the outer skin 20e of the housing 11. The ends 28c, 28d do not abut against the leg of the T-shape, but are spaced away from the retainer 26 to allow for expansion due to ordinary heating as may be expected from sunlight, considering that the device will be located outdoors. As seen in FIG. 1 and FIG. 3, the clear plastic sheathing 28 extends the full height of the housing 11 and substantially completely therearound to add to the appearance of the device, and for resistance to vandalism.

Referring again to FIG. 4, the semi-cylindrical halves 28a, 28b are secured in place by flathead screws 30, which lie flush with the outer surface of the top flange 26a of the retainer 26. The screws 30 pass through lateral slots (not shown) in the plastic sheets 28a, 28b which permit the referred to expansion thereof, and are anchored in the respective housing portions 20a, 20b.

Referring now to FIG. 3, the cap 13 is also preferably made from the anodized aluminum structural material of which the housing 11 is made, and therefore has an anodized aluminum outer top skin 13a which extends fully across the top of the device, as shown. The top 13 is backed by plywood 13b to increase its rigidity, and is cemented in place using epoxy resin or the like 13c.

The thus assembled housing 11 is mounted in fixed position at the exhibition site on a fixed cylindrical pedestal 15 (FIGS. 1 and 3) which is anchored in the ground G at a strategic location with respect to the intended site objects. The pedestal 15 is preferably a concrete pillar partially embedded in the ground G as shown, and having an upwardly protuding portion 15a on which the housing 11 is mounted.

Referring to FIG. 3, the housing 11 has an interiorly located pedestal adaptor 14 by which it is mounted on the protuding pedestal 15. The adaptor 14 has a cylindrical portion 14a whose inside diameter is substantially the same as the outside diameter of the pedestal protruding portion 15a, to be received on the latter as shown. The cylindrical portion 14a is made of aluminum, and is secured in position by an upper cylinder support 14b and a lower cylinder support 14c which are permanently bonded to the interior aluminum skin 20f of the housing 11 after the housing halves 20a, 20b, have been joined together as previously described. These cylinder supports are preferably made of one-quarter inch (¼") thick aluminum and are of welded construction as they include the illustrated downwardly turned rim portions 14d, which rigidify the support. Of course, the cylinder 14a may be welded to the cylinder supports 14b, 14c to form a subassembly before being joined to the housing 11. The thus preassembled pedestal adaptor 14 is attached to the interior of the housing 11 using any standard aluminum joining technique which does not require the use of exterior fasteners.

The height of the adaptor cylinder portion 14a is such that it projects below the lower end 11b of the housing 11 to facilitate its attachment to the protruding pedestal 15 using expansion bolts 16 in expansion shields 17 which are anchored within the concrete pedestal 15, as seen in FIG. 3. Preferably three bolts 16 are used in annularly spaced apart relation, the bolts being preferably three-eighths inch ($\frac{3}{8}$") diameter stainless steel bolts. The interior of the cylinder 14a and underside of the cylinder support 14b should be painted using alkaline resistant coating prior to mounting of the housing on the pedestal.

As illustrated in FIG. 1, printed indicia 31 appears on the outer surface of the device 10 adjacent to the respective sighting ends 12a of the viewing tubes 12, to provide information to the viewer regarding the site objectsto be seen therethrough. The printed indicia 31 is preferably applied to the interior surfaces of the semi-cylindrical sheathing halves 28a, 28b, using a silk-screen printing process on the plastic sheet material while it is flat, prior to cold rolling to its semi-cylindrical shape. Of course, as printed, the shapes of the lettering are initially somewhat distorted to accommodate the cold rolling process, and have the desired lettering shape after the semi-cylindrical halves are formed. Of course, pictures or other graphic displays and narrative copy can be included in the printing.

The device 10 is usually installed outdoors in an historical park or other public place, and is intended primarily to acquaint pedestrian visitors with various sites of particular interest. Referring now to FIG. 2, it is seen that the device 10 is installed at a location from which several points of interest are observable, such as the indicated "Old Mill", "Cafe", "Waterfall", "Church", "Covered Bridge", "Stone House", "Path", and "Foundry". The location of each can be plotted in terms of its bearing from a reference line, as indicated, and the bearing angles 40–47 from the reference line 48 may be plotted, as shown in FIG. 2. Although not illustrated, the azimuth angles of these respective site objects are also plotted from the location of the device 10, considering its height and the desired respective eye-level height locations on the housing 11 of the viewing tube sighting ends 12a. Referring to FIGS. 3 and 4, it will be understood that the viewing tubes 12 are disposed at various height locations on the device 10 corresponding to convenient eye-level heights for pedestrians, and are angled upwardly and laterally with respect to each other, depending upon the direction in which each is aimed or trained on a site object. Thus, tube arrangement depends on the particular park layout and the actual location of the device 10 therein. Preferably, some sighting ends are located nearer to the ground G for the convenience of children who may use the device 10.

In use, pedestrians approach the device 10, select a particular viewing tube 12 to use depending upon their interest in the legend and narrative copy appearing adjacent thereto, and then look through the tube from its sighting end 12a, as indicated in FIG. 3, to observe a particular site object. The one-way mirror 29 facilitates observation through the tube in the correct direction. The narrative copy adjacent to any particular viewing tube 12 gives the user some historical background or other information on the site object to be viewed therethrough.

Thus has been described a visual orientation device which achieves all of the objects of the invention.

What is claimed is:

1. A visual orientation device for pedestrians at a viewing site comprising an elongated vertical housing having a peripheral wall and a lower end, means mounting said housing peripheral wall in a fixed position at a selected location on said viewing site, and at least one elongated viewing tube extending across the interior of said housing, each said viewing tube having a sighting end attached substantially to said peripheral wall at a selected eye-level height location above said lower end on one side of said housing and an object end attached substantially to said peripheral wall at a selected height location on an opposite side of said housing whereby the viewing tube is in fixed position and aimed at an object site remote from said housing to be viewed therethrough by a pedestrian positioned exterior of said housing and adjacent to said sighting end of the tube, and means associated with each said viewing tube for identifying said object site seen therethrough.

2. A visual orientation device according to claim 1 which comprises a plurality of said viewing tubes each separated from each other and extending across said housing in a different direction with respect to each other, each being aimed at a different object site remote from said housing to be viewed through the viewing tube, said object site identifying means comprising printed indicia appearing on said housing adjacent to the respective of said viewing tubes.

3. A visual orientation device according to claim 1 or 2 wherein each said viewing tube has a one-way mirror therein permitting said viewing therethrough from said sighting end thereof but preventing viewing therethrough from said object end thereof.

4. A visual orientation device according to claim 1 or 2 wherein said housing peripheral wall further comprises transparent means extending respectively across and closing said sighting end and said object end of each said viewing tube.

5. A visual orientation device according to claim 2 which further comprises a fixed pedestal projecting above ground level, said housing being attached at its said lower end to said pedestal, said housing having an upper end, and a cap closing said upper end.

6. A visual orientation device according to claim 2 or 5 wherein said housing has vertical cylindrical shape, said sighting ends of said viewing tubes being disposed substantially within a semi-cylindrical area thereof, and said object ends of said viewing tubes being disposed substantially within the opposite semi-cylindrical area thereof.

7. A visual orientation device according to claim 6 wherein each said viewing tube has a one-way mirror therein adjacent to its said object end and permitting viewing therethrough from said sighting end thereof but preventing viewing therethrough from said object end thereof, and said housing further comprises transparent outer sheath means extending across and closing said sighting ends and said object ends of said plurality of viewing tubes.

* * * * *